United States Patent
Francois et al.

(10) Patent No.: US 10,963,259 B2
(45) Date of Patent: Mar. 30, 2021

(54) ACCOUNTING FOR MULTIPLE PIPELINE DEPTHS IN PROCESSOR INSTRUMENTATION

(71) Applicant: International Business Machines Corporation, Armonk, NY (US)

(72) Inventors: Avery Francois, Austin, TX (US); Gregory William Alexander, Pflugerville, TX (US); Jonathan Ting Hsieh, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 5 days.

(21) Appl. No.: 16/433,381

(22) Filed: Jun. 6, 2019

(65) Prior Publication Data
US 2020/0387378 A1  Dec. 10, 2020

(51) Int. Cl.
*G06F 9/38* (2018.01)
*G06F 9/22* (2006.01)

(52) U.S. Cl.
CPC .......... *G06F 9/3838* (2013.01); *G06F 9/223* (2013.01); *G06F 9/3867* (2013.01)

(58) Field of Classification Search
None
See application file for complete search history.

(56) References Cited

U.S. PATENT DOCUMENTS

| | | | | |
|---|---|---|---|---|
| 5,732,273 A | * | 3/1998 | Srivastava | G06F 11/3466 714/E11.2 |
| 5,751,945 A | * | 5/1998 | Levine | G06F 11/3409 714/47.2 |
| 6,378,022 B1 | * | 4/2002 | Moyer | G06F 9/3836 710/260 |
| 6,839,833 B1 | * | 1/2005 | Hartnett | G06F 9/3836 712/205 |
| 7,058,636 B2 | | 6/2006 | Coldewey | |
| 7,584,446 B2 | | 9/2009 | Crosetto | |

(Continued)

OTHER PUBLICATIONS

Transmittal Form PTO/SB/21, filed Mar. 16, 2020.
(Continued)

*Primary Examiner* — Eric Coleman
(74) *Attorney, Agent, or Firm* — Cantor Colburn LLP; William Kinnaman (57) ABSTRACT

Implementing processor instrumentation in a processor pipeline includes determining a pipeline depth of each micro-operator for an instruction group used in an execution phase of the processor pipeline. The pipeline depth corresponds with a duration of execution, each micro-operator performs a type of functional operation in the execution phase, and the instruction group includes all the micro-operators required for the execution phase. A targeted micro-operator is identified for which the processor instrumentation is being performed, and the pipeline depth corresponding with the targeted micro-operator is used to determine and report a performance of the targeted micro-operator as part of the processor instrumentation. Problems indicated by the processor instrumentation are diagnosed and addressed based on the performance of the targeted micro-operator.

20 Claims, 4 Drawing Sheets

(56) References Cited

U.S. PATENT DOCUMENTS

| | | | |
|---|---|---|---|
| 8,234,484 B2* | 7/2012 | Indukuru | G06F 9/3844 |
| | | | 712/227 |
| 8,249,848 B2* | 8/2012 | Letz | G06F 30/33 |
| | | | 703/14 |
| 8,453,124 B2 | 5/2013 | Alexander et al. | |
| 8,499,140 B2* | 7/2013 | Lichtensteiger | G06F 1/04 |
| | | | 712/244 |
| 8,738,860 B1 | 5/2014 | Griffin et al. | |
| 9,348,406 B2* | 5/2016 | Shen | G06F 11/30 |
| 2008/0141002 A1* | 6/2008 | Bhargava | G06F 9/3867 |
| | | | 712/220 |
| 2015/0121353 A1* | 4/2015 | Nowatzki | G06F 11/34 |
| | | | 717/155 |

OTHER PUBLICATIONS

Anonymous, "System for building a UIMA pipeline information map", IPCOM000235810D, dated Mar. 25, 2014, pp. 1-3.

IBM, "Pipeline Execution Event Instrumentation and Update Mechanism", IPCOM000186047D, dated Aug. 6, 2009, pp. 1-2.

Langelandsvik et al., "Accurate Calculation of Pipeline Transport Capacity", 2017, pp. 1-14.

* cited by examiner

FIG. 4 ively, to accounting for multiple
ACCOUNTING FOR MULTIPLE PIPELINE DEPTHS IN PROCESSOR INSTRUMENTATION

BACKGROUND

The present invention relates to out-of-order instruction processing, and more specifically, to accounting for multiple pipeline depths in processor instrumentation.

Instrumentation or, more specifically, processor instrumentation in the hardware context refers to monitoring or measuring the performance of a running processor. Instrumentation logic can provide metrics that facilitate the identification and mitigation of sources of performance issues. A software program involves the execution of many instructions by the processor. Instruction pipelining is a technique to implement instruction-level parallelism within a single processor. Instructions are divided into a series of sequential steps (i.e., pipelines) that are performed by different processor units in parallel. Thus, every part of the processor can be used at all times to increase the throughput. Through the pipelining technique, multiple instructions can be overlapped during execution (i.e., out-of-order instruction processing can be performed). Processor instrumentation logic can help to pinpoint which stage of a pipeline is responsible for stalling or delays in the instruction processing.

SUMMARY

Embodiments of the present invention are directed to methods and systems to implement processor instrumentation in a processor pipeline. A method includes determining a pipeline depth of each micro-operator for an instruction group used in an execution phase of the processor pipeline. The pipeline depth corresponds with a duration of execution, each micro-operator performs a type of functional operation in the execution phase, and the instruction group includes all the micro-operators required for the execution phase. The method also includes identifying a targeted micro-operator for which the processor instrumentation is being performed, and using the pipeline depth corresponding with the targeted micro-operator to determine and report a performance of the targeted micro-operator as part of the processor instrumentation. Problems indicated by the processor instrumentation are diagnosed and addressed based on the performance of the targeted micro-operator.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, pipelining is a technique for dividing instructions into different steps or stages, and processor instrumentation facilitates monitoring performance through those stages. An exemplary five-stage pipeline includes the stages of instruction fetch, instruction decode, execute, memory access, and write-back. The execute stage can involve one of several types of micro-operations, and the different types of micro-operations can involve a different number of cycles, referred to as pipeline depth. In prior instrumentation logic, the shortest pipeline depth (i.e., fastest case) among the types of micro-operations that can be used in the execution stage is assumed for all the different types of micro-operations. As a result, the instrumentation logic can misinterpret the performance in the execution stage when a micro-operation with a larger pipeline depth is used. That is, because the best-case (i.e., fastest) pipeline depth is assumed, a micro-operation with more cycles (i.e., larger pipeline depth) will appear stalled when it is still executing. On the other hand, if the worst-case (i.e., slowest) pipeline depth is assumed for all micro-operations, then a delay or stall in the execute stage for a micro-operation with a smaller pipeline depth will not be properly recognized and reported. Such inaccurate information from the instrumentation logic can mislead software developers regarding the pipeline stage at which to address performance issues. Embodiments of the invention relate to accounting for multiple pipeline depths in processor instrumentation. By facilitating more accurate diagnostics on the operation of a computer program, the one or more embodiments of the invention improve the performance of a computer system.

Figure 1:
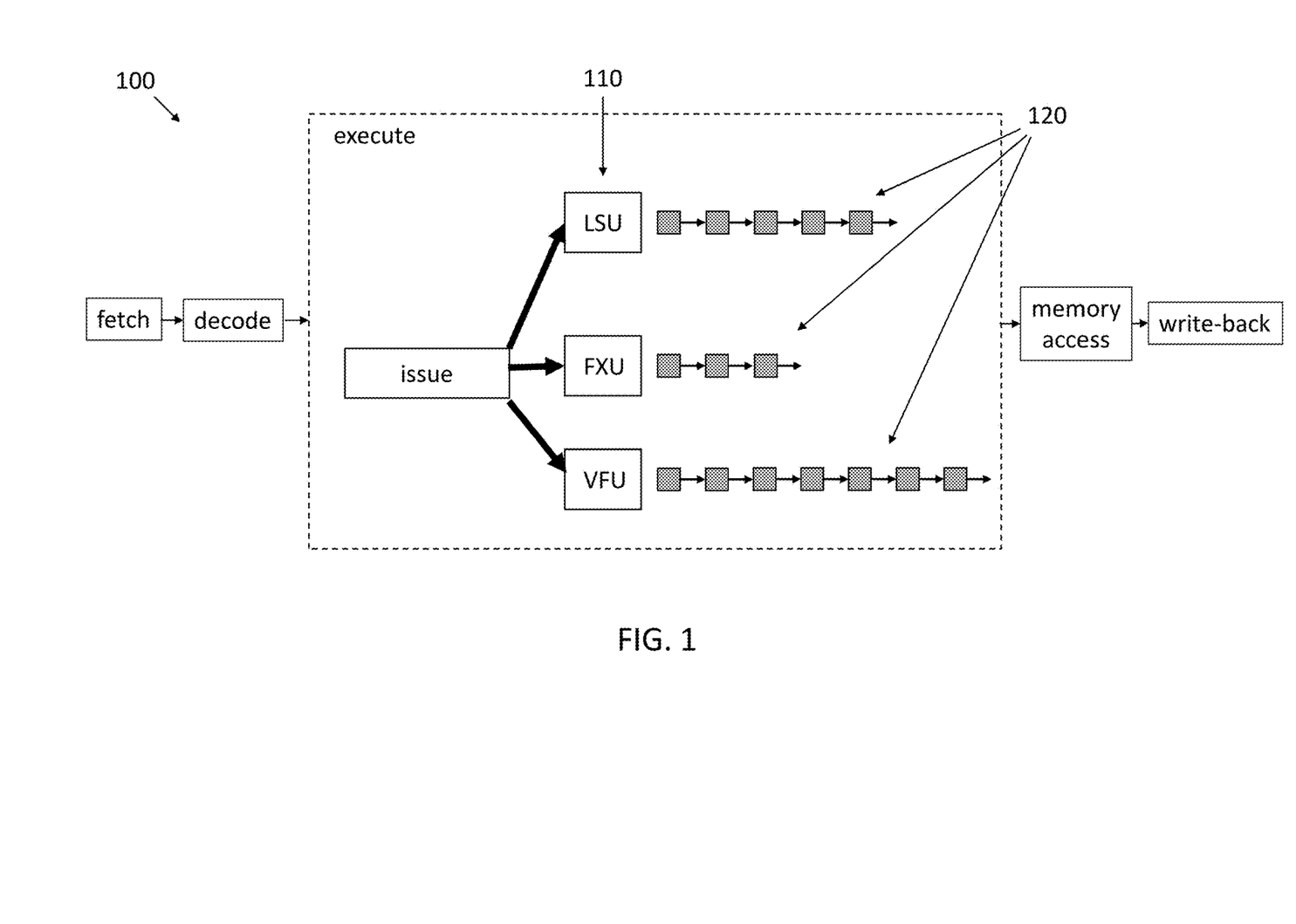
FIG. 1 shows exemplary micro-operations in an exemplary pipeline for which multiple pipeline depths are accounted for in processor instrumentation according to one or more embodiments of the invention.

FIG. 1 shows exemplary micro-operations in an exemplary pipeline for which multiple pipeline depths are accounted for in processor instrumentation according to one or more embodiments of the invention. An exemplary five-stage pipeline 100 with fetch, decode, execute, memory access, and write-back stages is shown. In the execute stage, the exemplary instruction group is shown to have three exemplary micro-operations (Uop 0, Uop 1, Uop 2) that correspond with three types of operations. The unit that performs each type of operation can be referred to, for explanatory purposes, as a micro-operator 110. In FIG. 1, the exemplary micro-operators 110 are a load store unit (LSU), fixed point unit (FXU), and vector floating point unit (VFU). The pipeline depth 120 of each of the micro-operators 110 is indicated. As shown, VFU micro-operator 110 has the longest pipeline depth 120 while the FXU micro-operator 110 has the shortest pipeline depth 120. As previously noted, the pipeline depth 120 of the FXU micro-operator 110 would be assumed for all the micro-operators 110 in the instruction group according to the prior art. Thus, the longer execution time required by the longer pipeline depth 120 associated with the LSU micro-operator 110 and the VFU micro-operator 110 would likely be misunderstood and mis-reported by the instrumentation logic.

According to one or more embodiments of the invention, the pipeline depth 120 associated with each micro-operator 110 is known and considered by the instrumentation logic. Processor instrumentation calculates the length of a stall at each processor stage. The processor instrumentation can report information in the form of instrumentation arrays, for example. At the completion of the instruction group, the delays and stalls reported by the instrumentation logic, according to one or more embodiments of the invention, take into account the actual processing time for each micro-operator 110. As a result, the VFU micro-operator 110, for example, is not reported as delayed by four cycles simply because the VFU micro-operator 110 has a pipeline depth 120 that is four cycles longer than the pipeline depth 120 of the FXU micro-operator 110.

Figure 2:
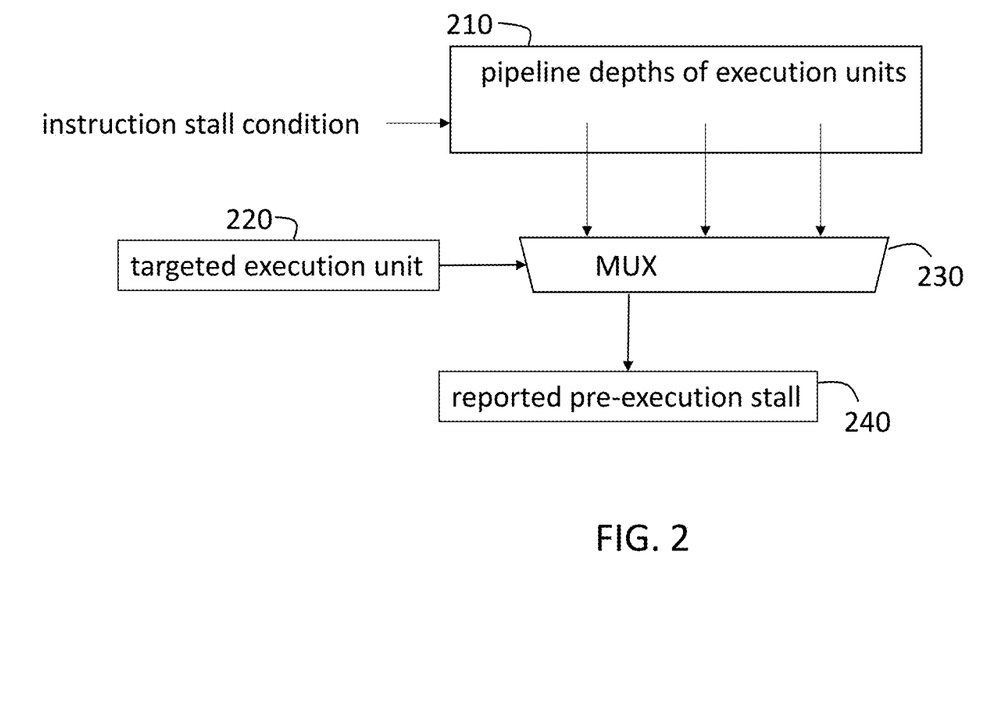
FIG. 2 illustrates aspects of instrumentation logic pertaining to accounting for multiple pipeline depths according to one or more embodiments of the invention.

FIG. 2 illustrates aspects of instrumentation logic pertaining to accounting for multiple pipeline depths according to one or more embodiments of the invention. The inputs to a multiplexer (MUX) 230, at block 210, are the pipeline depths 120 for all the micro-operators 110 of the instruction group. This pipeline depth 120 information is maintained, on a per-micro-operation type basis, until the instruction group flushed or completed (i.e., pipeline stage is passed). The selection for the MUX 230, at block 220, is the targeted micro-operator 110, from among all the micro-operators 110 of the instruction group. For example, when the LSU micro-operator 110 is being executed, the selection, at the block 220, indicates that the pipeline depth 120 for the LSU micro-operator 110 should be selected by the MUX 230 from the pipeline depths 120 available as inputs at block 210. Reporting pre-execution stall, at block 240, means that, as each of the micro-operator 110 is executed, the correct corresponding pipeline depth 120 is reported for use in the pipeline calculation by the instrumentation logic.

Figure 3:
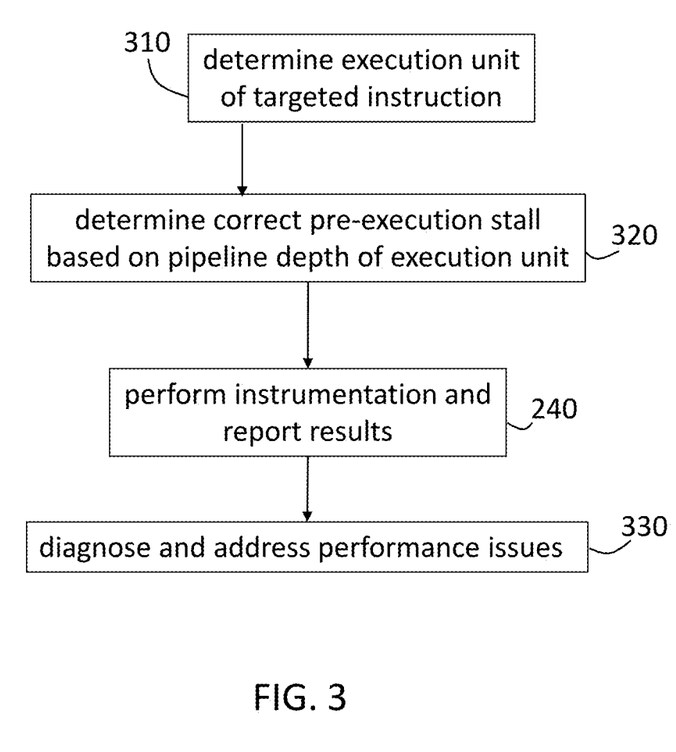
FIG. 3 is a process flow of a method of implementing aspects of instrumentation logic according to one or more embodiments of the invention.

FIG. 3 is a process flow of a method of implementing aspects of instrumentation logic according to one or more embodiments of the invention. At block 310, determining pipeline depth 120 of micro-operator 110 in the instruction group includes parsing the function code of each micro-operator 110, according to an exemplary embodiment of the invention. The function code indicates how long the operation performed by the micro-operator 110 will take within the execution unit. As previously noted, this information is maintained (i.e., instrumentation state is maintained) over the course of the lifetime of the instruction group in the machine. Identifying the targeted micro-operator 110, at block 320, can be based on looking at the destination execution unit during dispatch. Dispatch and issue can be thought of as aspects of the decode phase. Dispatch refers to assigning an instruction to a queue pertaining to a particular micro-operator 110. The instruction is issued to the micro-operator 110 after all the input operands are available.

At block 330, providing the correct pre-execution stall for the targeted micro-operator 110 is based on the processes discussed with reference to FIG. 2, for example. That is, a combination of the pipeline depths 120 corresponding with the micro-operators 110 (at block 310), as the MUX 230 input, and identification of the targeted micro-operator 110 (at block 320), as the MUX 230 selection, results in the correct pipeline depth 120 being provided. Performing instrumentation and reporting results, at block 340, is based on the pipeline depth 120. As previously noted, having the correct pre-execution stall information about the targeted micro-operator 110 facilitates accurate determination of any delay during the execution phase. The instrumentation facilitates correct identification of areas of the pipeline where throughput performance can be improved. Diagnosing and addressing performance issues, at block 350, is improved by the correct identification. For example, because the pipeline depth 120 associated with the FXU micro-operator 110 is not also used as the pipeline depth 120 of the VFU micro-operator 110, slow throughput through the VFU micro-operator 110 may properly be addressed at the decode stage. This is because any delay will not be misinterpreted as stalling of the VFU micro-operator 110.

Figure 4:
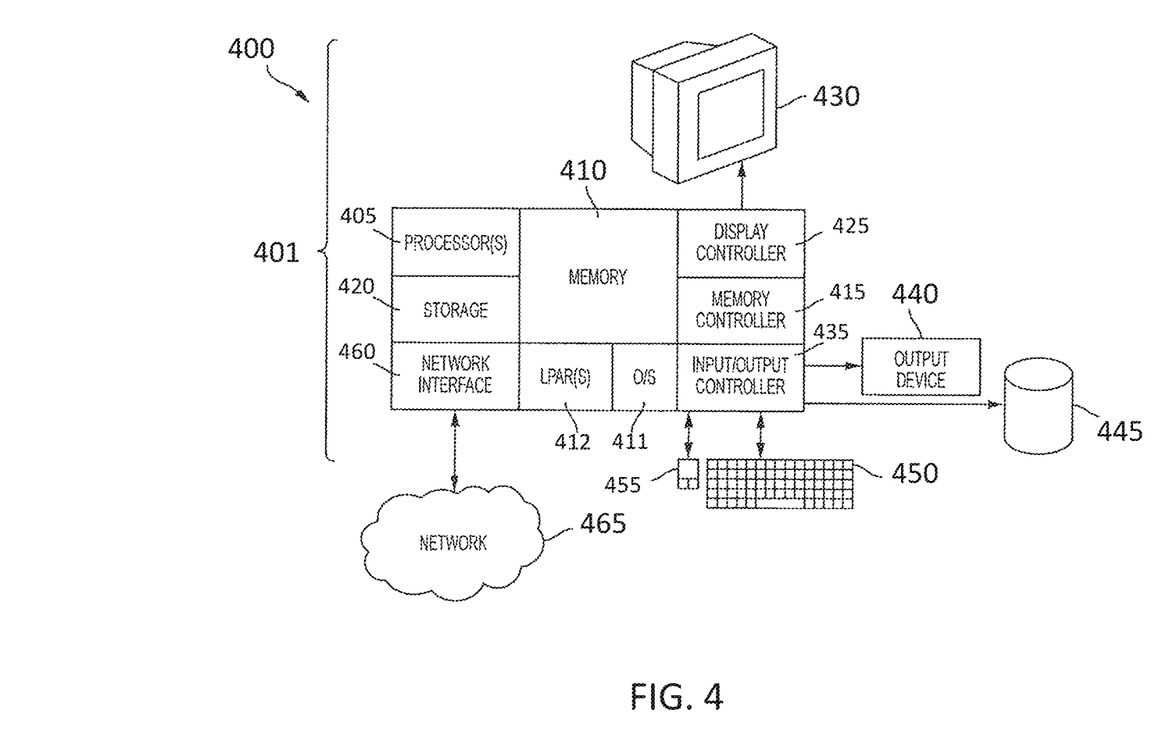
FIG. 4 is a block diagram of a computer system for processor operation and instrumentation in accordance with one or more embodiments of the invention.

Turning now to FIG. 4, a computer system for processor operation and instrumentation is generally shown in accordance with one or more embodiments of the invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400, therefore, may include a general-purpose computer or mainframe 401 capable of running multiple instances of an O/S simultaneously.

In an exemplary embodiment, in terms of hardware architecture, as shown in FIG. 4, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of implementing processor instrumentation in a processor pipeline, comprising:

determining, using a processor, a pipeline depth of each micro-operator for an instruction group used in an execution phase of the processor pipeline, wherein the pipeline depth corresponds with a duration of execution, each micro-operator performs a type of functional operation in the execution phase, and the instruction group includes all the micro-operators required for the execution phase, all the micro-operators being a plurality of the micro-operators;

identifying, using the processor, a targeted micro-operator for which the processor instrumentation is being performed;

the processor using the pipeline depth corresponding with the targeted micro-operator to determine a delay, which is a duration that is additional to the duration of execution corresponding with the pipeline depth corresponding with the targeted micro-operator, and report a performance of the targeted micro-operator as part of the processor instrumentation; and diagnosing and addressing problems indicated by the processor instrumentation based on the performance of the targeted micro-operator.

2. The computer-implemented method according to claim 1, wherein the determining the pipeline depth of each micro-operator includes parsing a function code of each micro-operator to determine a duration of execution within the micro-operator.

3. The computer-implemented method according to claim 1, wherein the identifying the targeted micro-operator includes examining a preceding phase of the processor pipeline.

4. The computer-implemented method according to claim 1, further comprising maintaining the pipeline depth of each micro-operator for the instruction group until the instruction group is flushed or completed.

5. The computer-implemented method according to claim 1, further comprising discarding the pipeline depth of each micro-operator for the instruction group following a flush or a completion of the instruction group.

6. The computer-implemented method according to claim 1, wherein the addressing problems includes maintaining the targeted micro-operator without changes based on the performance of the targeted micro-operator.

7. The computer-implemented method according to claim 1, wherein the addressing problems includes making changes to the micro-operator based on the performance of the targeted micro-operator.

8. A system to implement processor instrumentation in a processor pipeline, the system comprising:
   a memory device configured to store a pipeline depth of each micro-operator for an instruction group used in an execution phase of the processor pipeline, wherein the pipeline depth corresponds with a duration of execution, each micro-operator performs a type of functional operation in the execution phase, and the instruction group includes all the micro-operators required for the execution phase, all the micro-operators being a plurality of the micro-operators; and
   a processor configured to identify a targeted micro-operator for which the processor instrumentation is being performed and to use the pipeline depth corresponding with the targeted micro-operator to determine a delay, which is a duration that is additional to the duration of execution corresponding with the pipeline depth corresponding with the targeted micro-operator, and report a performance of the targeted micro-operator as part of the processor instrumentation, wherein problems indicated by the processor instrumentation based on the performance of the targeted micro-operator are diagnosed and addressed.

9. The system according to claim 8, wherein the processor determines the pipeline depth of each micro-operator by parsing a function code of each micro-operator to determine a duration of execution within the micro-operator.

10. The system according to claim 8, wherein the processor is configured to identify the targeted micro-operator by examining a preceding phase of the processor pipeline.

11. The system according to claim 8, wherein the processor is configured to maintain the pipeline depth of each micro-operator for the instruction group until the instruction group is flushed or completed.

12. The system according to claim 8, wherein the processor is configured to discard the pipeline depth of each micro-operator for the instruction group following a flush or a completion of the instruction group.

13. The system according to claim 8, wherein the performance of the targeted micro-operator indicates that changes are not needed to the micro-operator.

14. The system according to claim 8, wherein the performance of the targeted micro-operator indicates that changes not needed for the micro-operator.

15. A computer program product for implementing processor instrumentation in a processor pipeline, the computer program product comprising a computer readable storage medium having program instructions embodied therewith, the program instructions executable by a processor to perform a method comprising:
   determining a pipeline depth of each micro-operator for an instruction group used in an execution phase of the processor pipeline, wherein the pipeline depth corresponds with a duration of execution, each micro-operator performs a type of functional operation in the execution phase, and the instruction group includes all the micro-operators required for the execution phase, all the micro-operators being a plurality of the micro-operators;
   identifying a targeted micro-operator for which the processor instrumentation is being performed;
   using the pipeline depth corresponding with the targeted micro-operator to determine a delay, which is a duration that is additional to the duration of execution corresponding with the pipeline depth corresponding with the targeted micro-operator, and report a performance of the targeted micro-operator as part of the processor instrumentation, wherein problems indicated by the processor instrumentation based on the performance of the targeted micro-operator are diagnosed and addressed.

16. The computer program product according to claim 15, wherein the determining the pipeline depth of each micro-operator includes parsing a function code of each micro-operator to determine a duration of execution within the micro-operator.

17. The computer program product according to claim 15, wherein the identifying the targeted micro-operator includes examining a preceding phase of the processor pipeline.

18. The computer program product according to claim 15, further comprising maintaining the pipeline depth of each micro-operator for the instruction group until the instruction group is flushed or completed.

19. The computer program product according to claim 15, further comprising discarding the pipeline depth of each micro-operator for the instruction group following a flush or a completion of the instruction group.

20. The computer program product according to claim 15, wherein the addressing problems includes either maintaining the targeted micro-operator without changes or making changes to the micro-operator based on the performance of the targeted micro-operator.

* * * * *